Jan. 27, 1942.  R. I. GEIGER  2,271,136
FISHERMAN'S RIG AND ACCESSORIES
Filed May 31, 1939   3 Sheets-Sheet 1

INVENTOR.
RALPH I. GEIGER
BY C. Lauren Maltby
ATTORNEY.

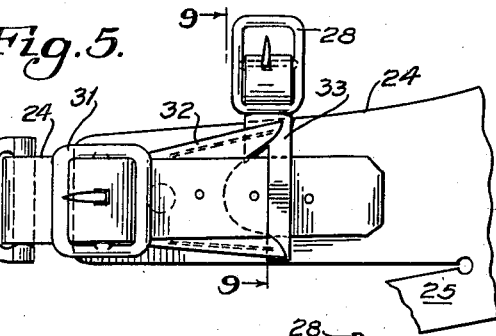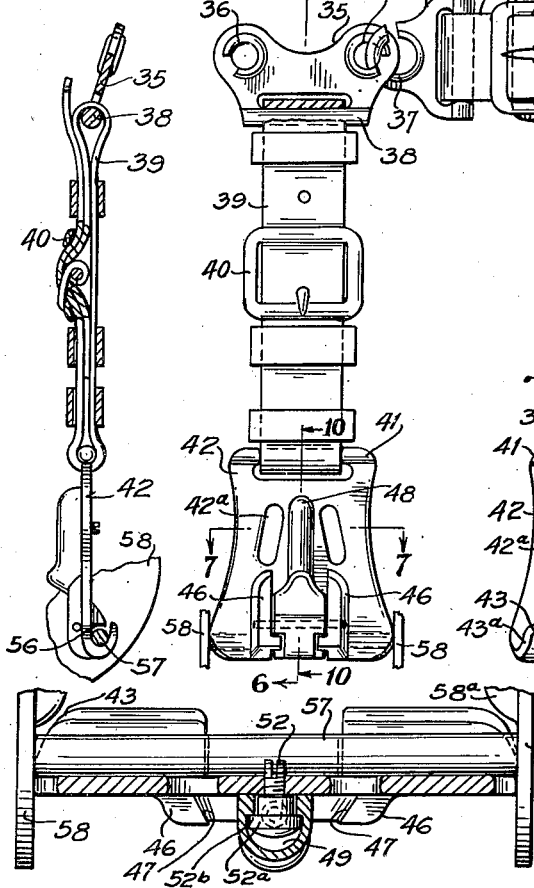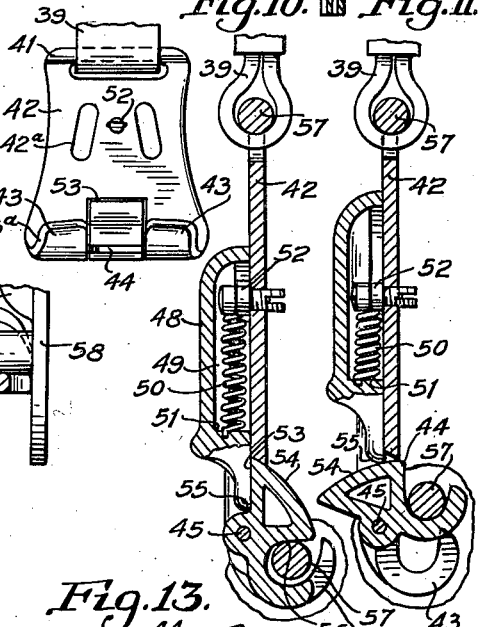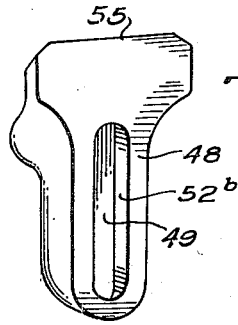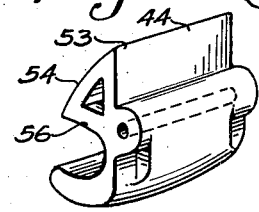

Jan. 27, 1942.    R. I. GEIGER    2,271,136
FISHERMAN'S RIG AND ACCESSORIES
Filed May 31, 1939    3 Sheets-Sheet 3
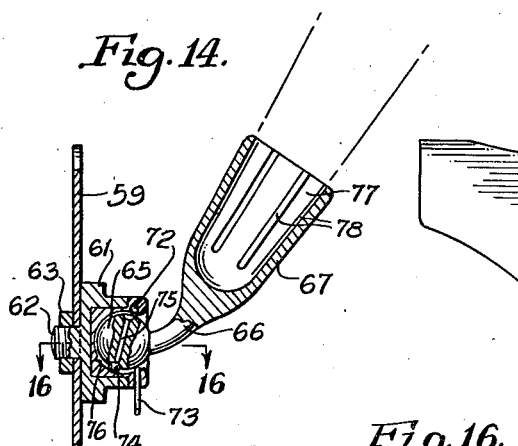
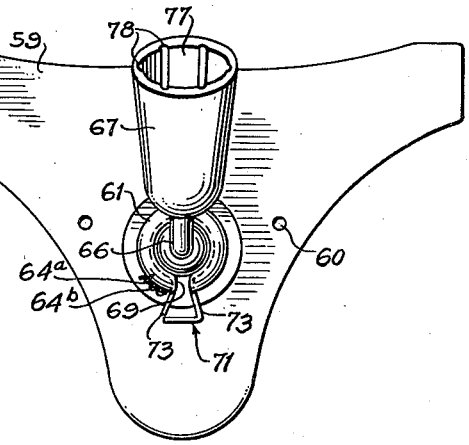
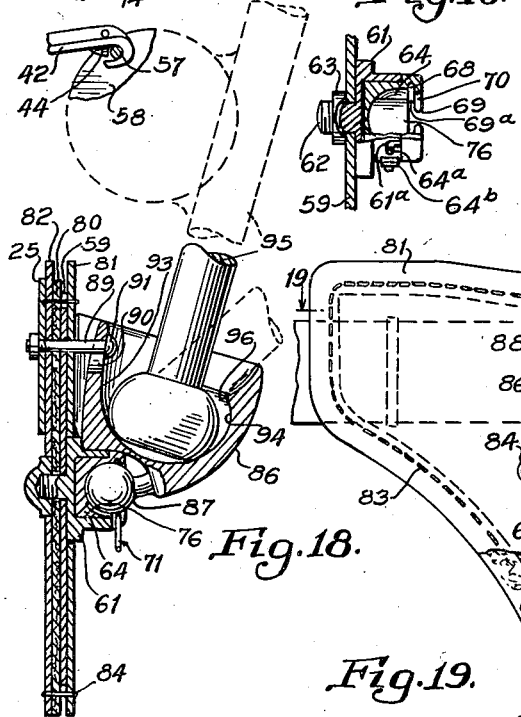
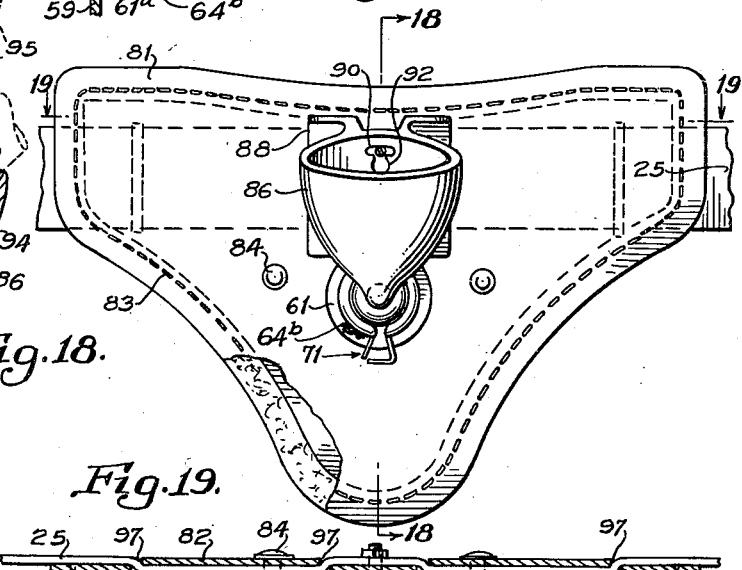
INVENTOR.
RALPH I. GEIGER
BY C. Lauren Maltby
ATTORNEY.

Patented Jan. 27, 1942

2,271,136

UNITED STATES PATENT OFFICE 2,271,136

FISHERMAN'S RIG AND ACCESSORIES

Ralph I. Geiger, Los Angeles, Calif.

Application May 31, 1939, Serial No. 276,605

5 Claims. (Cl. 224—5)

This invention relates to fishing equipment and more especially to a fisherman's rig and accessories, consisting of a center pull shoulder harness, a safety self-locking reel clamp, and an adjustable interchangeable rod butt belt socket.

An object of the invention is to provide an improved harness for use principally in deep water fishing.

Another object of the invention is to provide a fisherman's harness designed to afford a center pull and to overcome the shoulder strain and transfer the same to the back.

A further object of the invention is to provide a fisherman's harness adapted for the attachment of devices for several types of rod butts.

An additional object is to provide a novel, quick release safety clamp for a reel.

A further object is to provide an interchangeable adjustable support for rod butts adapted for attachment to the harness comprising part of this invention.

Other objects and advantages will appear and be brought out more fully in the following specification, reference being had to the accompanying drawings, wherein:

Fig. 5 is an enlarged partial view of the reel clamp adjustable hitch and adjacent supporting portions of the same;

Fig. 6 is a sectional view taken along the line 6—6 of Fig. 5;

Fig. 7 is a further enlarged sectional view taken along the line 7—7 of Fig. 5;

Fig. 8 is a back view of the clamp shown in Fig. 7;

Fig. 9 is a sectional view taken along the line 9—9 of Fig. 5;

Fig. 10 is an enlarged sectional view taken along the line 10—10 of Fig. 5;

Fig. 11 is a view similar to Fig. 10 illustrating the latch in open position;

Figs. 12 and 13 are perspective views of lock and latch parts;

Fig. 14 is a sectional view of the adjustable ball joint rod butt socket shown in Fig. 1;

Fig. 15 is a front view of the same;

Fig. 16 is a sectional view taken along the line 16—16 of Fig. 14;

Fig. 17 is a view similar to Fig. 15 showing a modified form of rod butt support;

Fig. 18 is a sectional view taken along the line 18—18 of Fig. 17;

Fig. 19 is a top view partly in section of the embodiments of Figs. 17 and 18; and Fig. 20 is a separate plan view of the cup shown in Figs. 17 to 19.

Figure 1:
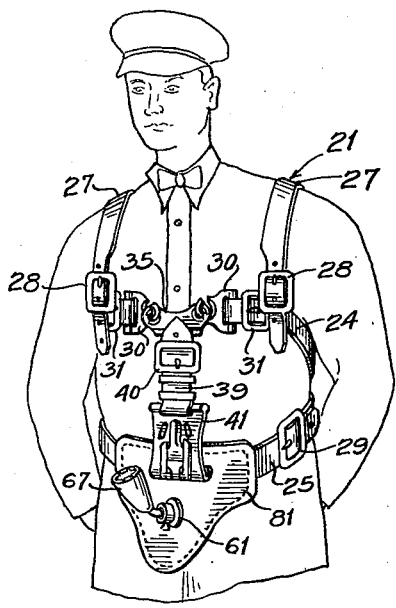
Fig. 1 is a front view of a harness embodying my invention showing the same in use.

Referring more particularly to the drawings and especially to Figs. 1 to 4, I show a shoulder harness 21 preferably of leather having a back portion 22 comprising a vertical portion 23 lower back portion, 22a, belt portions 24 and 25, and diagonal portions 26. Shoulder straps 27 are secured as by sewing or rivets to the upper part of back portion 22 and the front ends thereof are looped around belt portions 24 and provided with adjustable buckles 28. Belt portions 25 are provided with an adjustable buckle 29 preferably positioned at the side rather than at the center for a purpose which will be more fully explained hereinafter.

Belt portions 24 are each provided with a portion 24a carried around the pin portion of a cast metal hook member 30 and the free adjustable ends of portion 24a secured by buckles 31, the pin portions of which buckles are held by reinforcing pieces 32 sewed to an adjacent end portion of belt 24. Portions 24 have an adjusting strap 24a sewed to an adjacent portion of same. See Figure 5. The pin portions of buckles 28 are each held by a strap 33 sewed to belt 24, and straps 33 are each provided with a cut-out 34 permitting a portion thereof to be placed under and sewed to the tapered end portions of straps 32.

A suitably sized cast plate 35 to minimize pressure on the ribs is provided with a pair of eyelets 36 each adapted for engagement with a hook portion 37 of each member 30. Plate 35 has a pin 38 around which is looped a strap 39 having a buckle 40 for adjustment of the length thereof. Strap 39 is passed around a pin portion 41 of a reel clip 42 which comprises a plate member having a pair of lip portions 43 between which is positioned a lock 44 pivotally secured at 45 (Figs. 10 and 11) to a pair of bosses 46 formed on clip plate 42. Bosses 46 have inclined under-cut faces 47 (Fig. 7) forming ways for a locking slide 48 (Figs. 10 and 11), slide 48 having a recess 49 for a spring 50, there being a shoulder 51 in recess 49 for one end of the spring, the other end of which is held against a pin 52 extending through plate 42. Pin 52 has an elliptical shaped shouldered head 52a (Fig. 7) adapted to engage a pair of shoulders 52b in recess 49 and the inner side walls thereof whereby the turning of the pin 52 will lock slide 48 and prevent accidental release of the same. Plate 42 has a pair of apertures 42a through which the fishing line on the reel spool can be kept in sight. Lock 44 has a flat surface portion 53 (Figs. 10 and 11), a curved portion 54 for engagement with an edge portion 55 of slide 48, and a shoulder surface 56 for securing a cross bar 57 of a reel 58 (Fig. 18) to lips 43 of clip 42.

As may be seen from Figs. 10 and 11, reel cross bar 57 may be placed in the curved portion 56 of lock 44 and pressed downwardly which causes lock 44 to pivot to the position shown in Fig. 10 whereupon slide 48 is urged by spring 50 downwardly, causing portion 55 to pass over surface 53 thus locking reel cross bar 57 in the curve of lips 43 and surface 56. Thus the reel is securely held in the clip but may be readily released by withdrawing slide 48 freeing lock 44 in the reverse manner. The extreme width of the pair of lips 43 is less than the maximum width of plate 42 and the outer ends of lip 43 are chamfered at 43a (Fig. 7) to provide clearance for the reel spool 58a.

Referring to Figs. 14 to 18 I show adjustable rod butt sockets, mounting plate and cover members therefor. A metallic plate 59 shaped substantially as shown in Fig. 15 is provided with a plurality of apertures 60 for the riveting of cover members which will be more fully described hereinbelow. Metallic plate 59 is backed with a felt sheet 80 and the same are secured between front and back leather covers 81 and 82 respectively and the edge portions thereof which extend beyond the edges of plate 59 are sewed together as at 83 and the assembly may be further strengthened by rivets 84 if desired.

A socket element 61 has a threaded stud portion 62 which extends through an aperture in plate 59 and is secured thereto by a nut 63. Element 61 has a cylindrical recess adapted to receive a spherical recessed element 64 adapted to receive a ball 65 secured to a shank 66 of a rod butt socket 67. Element 64 has a pin 64a which locks in an angular groove 61a in element 61 for quick removal of element 64 from element 61 when desired. A spring clip 64b is secured to element 61 and the clip has an aperture for engaging the end of pin 64a. An annular groove 68 is formed in element 64 and a slot 69 having a portion 69a in groove 68 is formed in a portion of an annular opening 70 of recess 64. A resilient wire retainer 71 has an annular portion 72 (Fig. 14) adapted to fit in groove 68 and a pair of radial extensions 73 which upon being compressed will pass through slot 69 into locking slots 69a and permit the annular portion 72 to be fitted and withdrawn from groove 68 for securing ball 65 in spherical recess 64 by which the ball is retained in the socket.

In order to prevent complete rotation of rod butt socket 67 a small ball 74 is suitably secured as by a pin 75 to ball 65 and a flat groove 76 is formed in a portion of spherical recess 64. Socket 67 has a tapered bore 77 and a plurality of recessed flutes 78 whereby to receive and secure the end of a tapered rod butt. Shank 66 is curved so as to minimize downward pressure and put pressure backwards on the ball socket and plate. Such a rod butt may be securely held but readily released by means of the flutes 78. This type of rod socket is particularly adapted to heavy tackle.

In Figs. 17 to 20 I show a rod butt socket particularly adapted for rods not having a tapered butt, usually a ball rubber butt cap. A rod butt socket 86 substantially cup shaped is provided with a ball 87 for socket element 64 and is secured thereto by spring element 71. Socket 86 has a flange portion 88 which is held against cover 81 of plate 59 by a pin 89 extended therethrough and into a somewhat T-shaped slot 90 formed in the rear wall of the socket, pin 89 having a shoulder head 91 which may be admitted into the enlarged portion 92 of slot 90.

Slot 90 extends laterally to permit some movement of the socket 86. Socket 86 has a substantially spherical recess 93 for receiving the rubber ball portion 94 of a rod butt 95, and an inwardly extending shoulder 96 in the front portion of recess 93 will prevent the accidental removal of the rod butt from the socket except when the rod is inclined forwardly at a considerable angle as indicated in the dotted position of Fig. 18. Back cover 82 is slotted at 97 (Fig. 19) to receive belt strap 25 by which the socket assembly is secured to the harness 21.

Figure 2:
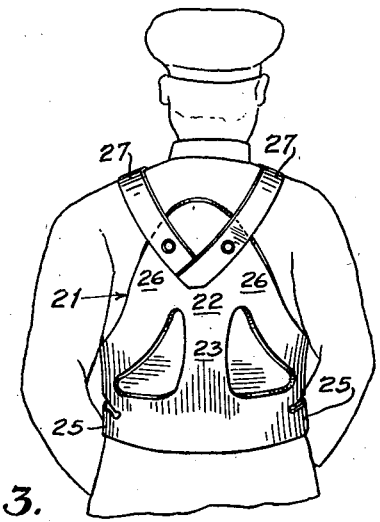
Fig. 2 is a rear view of the same.
Figure 3:
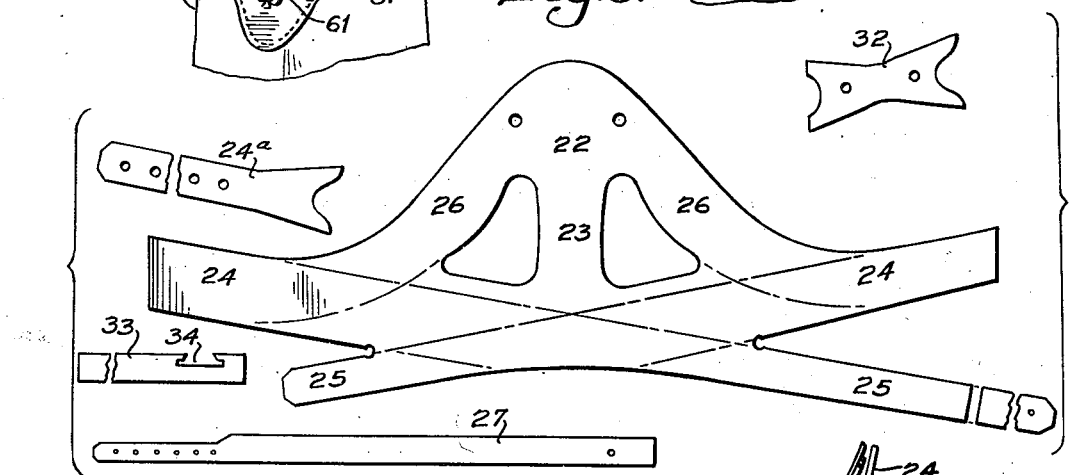
Fig. 3 is an exploded view of the parts comprising the harness.
Figure 4:
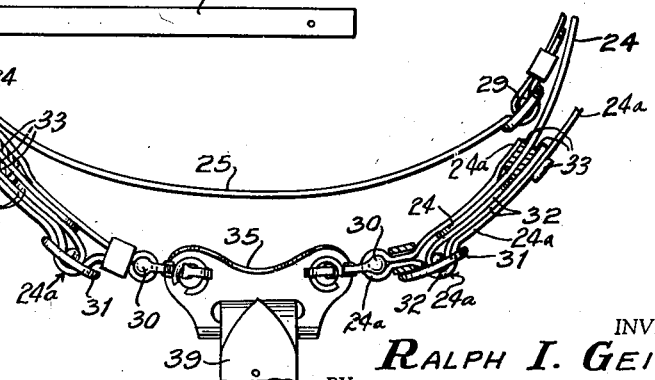
Fig. 4 is a top view of the front portion of the same.

It will be understood that plate 59 is provided with felt and leather cover members similar to those of Figs. 18 and 19. It will also be clear that the harness herein shown and described is adjustable in the provision of buckles 28, 31 and 40. The harness may be constructed to a definite size or to fit a specific person and the adjustable feature 31 may be omitted. The harness may be provided with apertures as shown in Fig. 2 of any size and arrangement to reduce weight and permit maximum comfort, and to keep the harness from crawling.

If it is desired to support the rod butt from a chair seat, a socket element similar to element 61 may be provided having a stud portion similar to stud 62 but of sufficient length to extend through a hole bored in the seat or the socket element could be secured to the seat by some other equivalent securing device. In such a case the socket element 64 can be shifted from the harness socket 61 and transferred to the seat socket element. Parts are thus interchangeable.

As will be seen from Fig. 1, the suspension of plate 35 is high across the chest and permits maximum body movement to facilitate reeling in of the line.

Having described my invention, what I claim is:

1. A fisherman's harness, or the like, as described having a vertical back portion, a chest hitch portion extending diagonally downwardly and rearwardly at each side and meeting at the lower end of said back portion, a chest hitch portion extension extending diagonally upwardly and rearwardly at each side and meeting at the upper end of said back portion, a belt portion extending forwardly at each side from said diagonal downwardly and rearwardly extending chest hitch portion, and a center pull adjustable strap hitch having a readily detachable connection with said chest hitch portion.

2. A fisherman's harness, or the like, as described having a vertical back portion, a chest hitch portion extending diagonally downwardly and rearwardly at each side and meeting at the lower end of said back portion, a chest hitch portion extension extending diagonally upwardly and rearwardly at each side and meeting at the upper end of said back portion, a belt portion extending forwardly at each side from said diagonal downwardly and rearwardly extending chest hitch portion, and a center pull adjustable strap hitch having a readily detachable connection with said chest hitch portion, said hitch and chest hitch connection comprising a plate adapted to minimize the pressure on the ribs.

3. A fisherman's harness, or the like, as described having a vertical back portion, a chest hitch portion extending diagonally downwardly and rearwardly at each side and meeting at the lower end of said back portion, a chest hitch portion extension extending diagonally upwardly and rearwardly at each side and meeting at the upper end of said back portion, a belt portion extending forwardly at each side from said diagonal downwardly and rearwardly extending chest hitch portion, and a center pull adjustable strap hitch having a readily detachable connection with said plate, said adjustable strap hitch adapted to be secured to a reel clip.

4. A fisherman's harness, or the like, as described having a vertical back portion, a chest hitch portion extending diagonally downwardly and rearwardly at each side and meeting at the lower end of said back portion, a chest hitch portion extension extending diagonally upwardly and rearwardly at each side and meeting at the upper end of said back portion, a belt portion extending forwardly at each side from said diagonal downwardly and rearwardly extending chest hitch portion, and a center pull adjustable divided strap hitch having a readily detachable connection with said plate, said adjustable divided strap hitch adapted to be secured to snap hooks adapted to be secured to reel snap rings.

5. A fisherman's harness, or the like, as described having a vertical back portion, a chest hitch portion extending diagonally downwardly and rearwardly at each side and meeting at the lower end of said back portion, a chest hitch portion extension extending diagonally upwardly and rearwardly at each side and meeting at the upper end of said back portion, a belt portion extending forwardly at each side from said diagonally downwardly and rearwardly extending chest hitch portion.

RALPH I. GEIGER.